United States Patent
Johannus Michiels et al.

(10) Patent No.: US 12,019,759 B2
(45) Date of Patent: Jun. 25, 2024

(54) DATA PROCESSING SYSTEM AND METHOD FOR PROTECTING DATA IN THE DATA PROCESSING SYSTEM

(71) Applicant: NXP B.V., Eindhoven (NL)

(72) Inventors: Wilhelmus Petrus Adrianus Johannus Michiels, Reusel (NL); Jan Hoogerbrugge, Helmond (NL); Ad Arts, Heeze (NL)

(73) Assignee: NXP B.V., Eindhoven (NL)

( * ) Notice: Subject to any disclaimer, the term of this patent is extended or adjusted under 35 U.S.C. 154(b) by 429 days.

(21) Appl. No.: 17/143,762

(22) Filed: Jan. 7, 2021

(65) Prior Publication Data

US 2022/0215103 A1 Jul. 7, 2022

(51) Int. Cl.
*G06F 12/1009* (2016.01)
*G06F 21/60* (2013.01)
*G06F 9/455* (2018.01)
*G06N 20/00* (2019.01)

(52) U.S. Cl.
CPC .......... *G06F 21/60* (2013.01); *G06F 12/1009* (2013.01); *G06F 9/45558* (2013.01); *G06F 2212/657* (2013.01); *G06N 20/00* (2019.01)

(58) Field of Classification Search
CPC ...... G06F 21/60; G06F 21/79; G06F 12/1009; G06F 9/45558; G06F 2212/657; G06F 2009/45583; G06F 2009/45587; G06N 20/00
See application file for complete search history.

(56) References Cited

U.S. PATENT DOCUMENTS

| | | | |
|---|---|---|---|
| 8,364,931 B2 | 1/2013 | Chiang et al. | |
| 8,694,797 B2 * | 4/2014 | Challener | G06F 21/56 717/174 |
| 8,990,541 B2 * | 3/2015 | Bello | G06F 12/08 711/E12.059 |

(Continued)

FOREIGN PATENT DOCUMENTS

WO WO-2019045869 A1 * 3/2019 ......... G06F 12/1408

OTHER PUBLICATIONS

Brasser, DR.SGX: Hardening SGX Enclaves against Cache Attacks with Data Location Randomization, 2017, pp. 1-16 (Year: 2017).*

(Continued)

*Primary Examiner* — Lynn D Feild
*Assistant Examiner* — Abdullah Almamun
(74) *Attorney, Agent, or Firm* — Daniel D. Hill

(57) ABSTRACT

A data processing system has a processor and a system memory. The system memory may be a dynamic random-access memory (DRAM). The processor includes an embedded memory. The system memory is coupled to the processor and is organized in a plurality of pages. A portion of the code or data stored in the plurality of memory pages is selected for permutation. A permutation order is generated and the memory pages containing the portion of code or data is permuted using a permutation order. The permutation order and/or a reverse permutation order to recover the original order may be stored in the embedded memory. Permuting the memory pages with a permutation order stored in the embedded memory prevents the code or data from being read during a freeze attack on the system memory in a way that is useful to an attacker.

16 Claims, 4 Drawing Sheets

(56) References Cited

U.S. PATENT DOCUMENTS

| | | | |
|---|---|---|---|
| 9,673,977 B1* | 6/2017 | Kalach | H04L 9/0816 |
| 9,940,457 B2 | 4/2018 | Healy et al. | |
| 10,120,812 B2* | 11/2018 | Sivaprakasam | G06F 12/1009 |
| 2003/0107942 A1* | 6/2003 | Perner | G11C 7/24 |
| | | | 365/230.03 |
| 2014/0020112 A1* | 1/2014 | Goodes | G06F 12/1408 |
| | | | 726/26 |
| 2016/0269214 A1* | 9/2016 | Popovic | H03M 13/256 |
| 2017/0032108 A1* | 2/2017 | Amaral Cid | H04L 9/0643 |
| 2017/0061138 A1* | 3/2017 | Lambert | H04L 63/18 |
| 2017/0357593 A1* | 12/2017 | Lau | G06F 21/51 |
| 2017/0357724 A1* | 12/2017 | Narayanam | G06Q 50/01 |
| 2018/0246818 A1* | 8/2018 | Tsirkin | G06F 9/45558 |
| 2020/0186350 A1* | 6/2020 | Wentz | G06F 21/62 |
| 2020/0250318 A1* | 8/2020 | Al Belooshi | H04L 9/0662 |
| 2020/0310979 A1* | 10/2020 | Kozhikkottu | G06F 12/1009 |
| 2020/0371953 A1* | 11/2020 | Guo | G06F 13/4282 |
| 2022/0171714 A1* | 6/2022 | Cheng | H04L 63/04 |
| 2023/0018412 A1* | 1/2023 | Tsirkin | G06F 12/1408 |

OTHER PUBLICATIONS

Chen, Secure In-Cache Execution, 2017, pp. 1-20 (Year: 2017).*

Davi, Lucas et al.; "PT-Rand: Practical Mitigation of Data-Only Attacks Against Page Tables;" The Network and Distributed System Security Symposium (NDSS), Feb. 26-Mar. 1, 2017; San Diego, California.

Meadows, Brett et al.; "On-Chip Randomization for Memory Protection Against Hardware Supply Chain Attacks to DRAM;" 2020 IEEE Security and Privacy Workshops (SPW); May 21, 2020, San Francisco, California; DOI: 10.1109/SPW50608.2020.00044.

Michiels, Wil; "How Do You Protect Your Machine Learning Investment?" Mar. 31, 2020; EE|Times.

U.S. Appl. No. 17/066,179; Jan Hoogerbrugge, et al.; "Data Processing System And Method For Accessing Data In The Data Processing System;", filed Oct. 8, 2020.

* cited by examiner

DATA PROCESSING SYSTEM AND METHOD FOR PROTECTING DATA IN THE DATA PROCESSING SYSTEM

BACKGROUND

Field

This disclosure relates generally to data processing, and more particularly, to protecting data in a data processing system.

Related Art

A dynamic random-access memory (DRAM) is one of the most common types of memory integrated circuits used in personal computers and some other computing devices. It has been found that cooling down, or "freezing," a DRAM causes the DRAM to retain data for a period of time after power is removed from the DRAM. The time period while data is still being retained may allow an attacker enough time to read out the data stored in the DRAM. To read the data, the attacker removes the DRAM from the computer and connects the DRAM into the attacker's system. Therefore, the attacker must have physical access to the device. One possible countermeasure against the DRAM freezing attack is to encrypt all the data on the DRAM. However, this requires special hardware and incurs a performance penalty.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
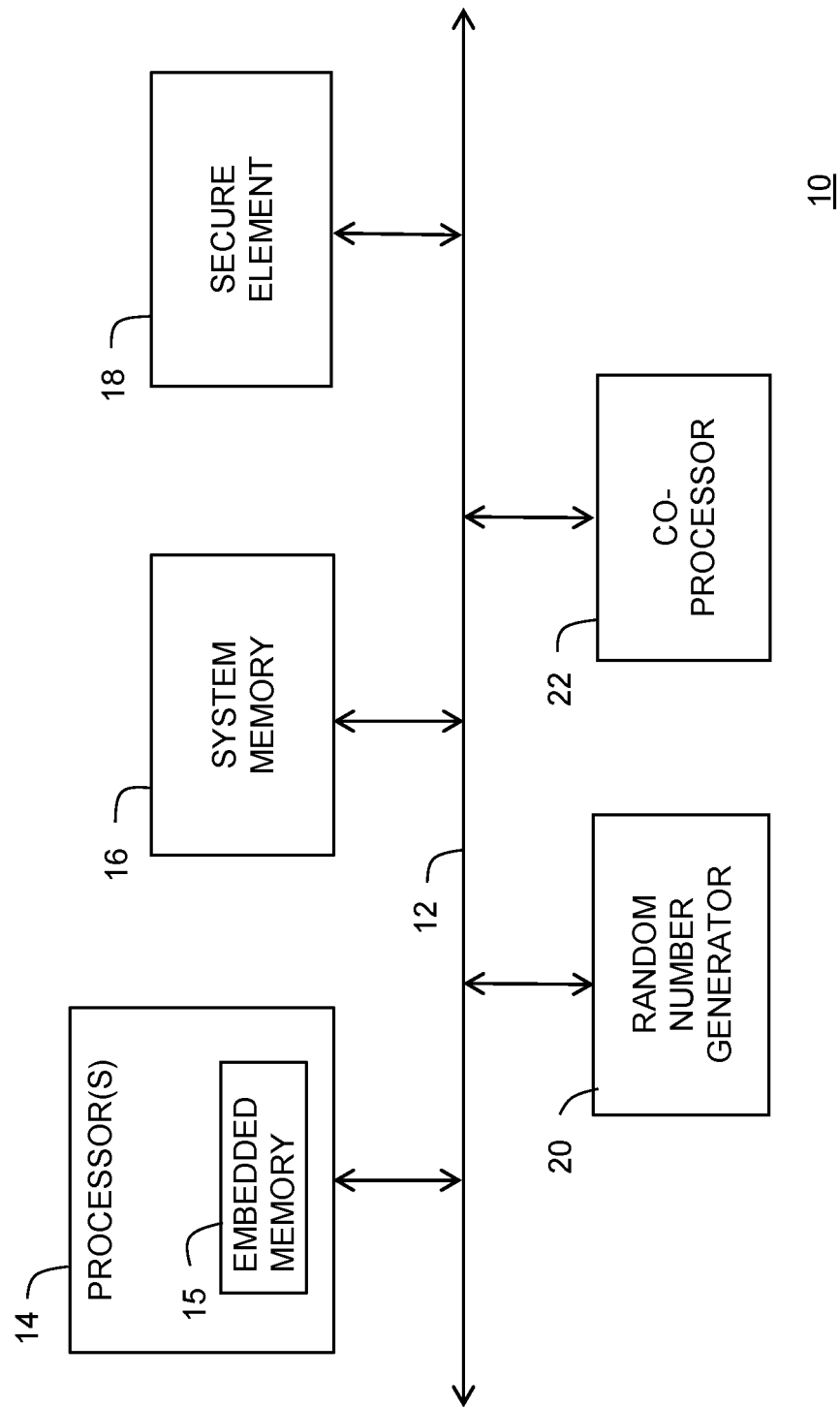
FIG. 1 illustrates a data processing system in accordance with an embodiment.

Generally, there is provided, a data processing system and method for protecting data or code stored in a system memory that is susceptible, or vulnerable, to a freeze attack. The system memory may be partitioned into a plurality of portions sometimes called pages. In the method a portion of the data or code is selected for protection, for example, an application, where the portion is less than all the data or code. The memory pages containing the portion of code or data is permuted. A permutation order is first generated for the memory pages storing the portion of the data or code. The permutation order may be randomly generated. Using the generated permutation order, the addressing order of the memory pages storing the data or code is permuted to create a reordered portion of data or code. The order of the data or code within the memory pages is unchanged. The permutation order is then stored in an embedded memory of a processor of the data processing system. The embedded memory is embedded because it has no data or address terminals that can be easily accessed, making the embedded memory less vulnerable to a freeze attack. In one embodiment, the permutation order may be stored encrypted in the data processing system.

In one embodiment, the data processing system may have multiple levels of memory hierarchy with multiple levels of address translation. The order of any one of the multiple levels of memory hierarchy can be permuted.

The disclosed embodiments provide an effective and cost-efficient method and data processing system to protect a DRAM against a freeze attack. The method can be implemented fully in software and without any hardware modifications to the data processing system. The disclosed embodiments can be used to provide additional protection of sensitive and expensive software code and data, such as a machine learning (ML) model, which is typically a very big collection of weights, having, for example, a size of 10 megabytes (MB).

In one embodiment, there is provided, a method for protecting data or code stored in a first addressing order in a first memory from a freeze attack, the method including: choosing a portion of the data or code to permute, wherein the portion is less than all the data or code stored in the first memory; generating a permutation order; using the permutation order, permuting the first addressing order of the portion of the data or code to be a second addressing order different from the first addressing order; and storing the permutation order in a second memory, wherein the second memory has a smaller storage capacity than the first memory. The first memory may be a standalone dynamic random-access memory (DRAM) and the second memory is embedded in a processor. The second memory may be an embedded DRAM. The first memory may be organized in a plurality of memory pages, each memory page of the plurality of memory pages may have a predetermined size, and wherein permuting the portion of the data or code may include permuting an order of the memory pages that store the portion of the data or code. The permutation order may be stored in a memory address table for mapping virtual addresses to physical addresses. The memory address table may be one of either a first level address translation table (FLAT) or second level address translation table (SLAT) in a data processing system having a hypervisor for managing the second level address translation. A size of each memory page of the plurality of memory pages may be 4 kilo bytes (KB). The permutation order may be generated randomly. The permutation order may be stored encrypted in the second memory. The portion of data or code may be a contiguous portion of data or code.

In another embodiment, there is provided, a method for protecting data or code stored in a first memory of a data processing system from a freeze attack, the data processing system having a first level of address translation (FLAT) and a second level of address translation (SLAT), the method including: choosing a portion of data or code stored in the first memory, wherein the portion of data or code is less than all the data or code stored in the first memory; generating a permutation order; using the permutation order, permuting the addressing order of the portion of the data or code in one of the FLAT or the SLAT; and storing the permutation order in a second memory, wherein the second memory has a smaller storage capacity than the first memory. The second memory may be embedded in a processor of the data processing system. The permutation order may be stored in a FLAT table or a SLAT table. The first memory may be organized in a plurality of memory pages, each memory page of the plurality of memory pages may have a predetermined size, and wherein permuting the portion of the data or code may include permuting the memory pages that store the portion of the data or code. The permutation order may be determined randomly. The permutation order may be stored encrypted in the second memory.

In yet another embodiment, there is provided, a data processing system including: a bus; a processor having an embedded memory coupled to the bus; and a system memory coupled to the bus, wherein the system memory is organized in pages, wherein pages of the system memory that store a portion of data or code is permuted using a permutation order, wherein the portion of data or code is less than all of the data or code stored in the system memory, and wherein the portion of data or code is stored in the system memory in the permutation order, and wherein the permutation order is stored in the embedded memory. The permutation order may be stored encrypted in the embedded memory. The data processing system may be implemented with a first level of address translation (FLAT) controlled by an operating system and a second level of address translation (SLAT) controlled by a hypervisor, and wherein the permutation order may be implemented in one of the FLAT or the SLAT. The system memory may be a dynamic random-access memory (DRAM) that is vulnerable to a freeze attack.

FIG. 1 illustrates data processing system 10 in accordance with an embodiment. Data processing system 10 may be implemented on one or more integrated circuits. Data processing system 10 may be used in, e.g., a system having multi-level address translation in accordance with an embodiment. Data processing system 10 includes bus 12. Connected to bus 12 is one or more processor(s) 14, system memory 16, secure element 18, random number generator 20, and co-processor 22. The one or more processor(s) 14 may include any hardware device capable of executing instructions stored in system memory 16. For example, processor(s) 14 may be used to execute code in sensitive applications for payment or other secure transactions. Processor(s) 14 may be, for example, a microprocessor, field programmable gate array (FPGA), application-specific integrated circuit (ASIC), or similar device. In accordance with an embodiment, a guest OS(s) and hypervisor may be implemented in code on processor(s) 14. Processor(s) 14 also includes an embedded DRAM 15 which may also be called an on-chip RAM (OCRAM). As shown in FIG. 1, embedded DRAM 15 is implemented on the same integrated circuit as processor 14 and is embedded within the circuitry of the processor so that there is no easy access to input and output ports of the embedded DRAM. Typically, embedded DRAM 15 is used for storing program code, data, or as a cache.

System memory 16 may be any kind of memory, such as for example, L1, L2, or L3 cache. In one embodiment, system memory 16 is a dynamic random-access memory (DRAM). In one embodiment, system memory 16 may be, for example, a DIMM (dual-in line memory) or a DDR (double data rate random access memory) that includes one or more integrated circuits. The integrated circuits may be mounted on a substrate that is plugged into a socket in data processing system 10, and therefore is easily removeable from the system, making it susceptible or vulnerable to a freeze attack. Note that system memory 16 generally has many times more storage capacity than embedded DRAM 15.

Secure element 18 may be a secure hardware element that provides tamper resistance and another layer of security from attacks. Secure element 18 may also include a processor for running sensitive applications, such as payment applications.

Co-processor 22 is bi-directionally connected to bus 12. Co-processor 22 may be a special type of one or more co-processors optimized for running encryption/decryption security software according to AES, DES, or other type of encryption algorithm. Also, in one embodiment, a hypervisor may be implemented using co-processor 22. In addition, an algorithm executed on co-processor 22 may be used to encrypt/decrypt data and instructions. Alternatively, co-processor 22 be used for another purpose, such as graphics processing.

Random number generator 20 may be a pseudo random number generator and may be used to provide, for example, random numbers for use in, for example, generating encryption/decryption keys and the like. Random number generator 20 may also be used to generate a random permutation order for permuting a portion of the system memory in accordance with an embodiment as described herein. In one embodiment, the random permutation order is computed when the software, such as program code and/or data, is prepared prior to loading the permuted memory pages in system memory 16. For example, the permuted memory pages may be permuted and stored in a flash memory (not shown) of the data processing system prior to loading the permuted memory pages in system memory 16.

Generally, in operation, data processing system 10 provides a countermeasure against a freezing attack of system memory 16. The countermeasure can be implemented fully in software and uses a portion of embedded DRAM 15 to store the permutation order. Because inputs and outputs of embedded DRAM 15 cannot be easily accessed, it is not vulnerable to the freezing attack. The countermeasure is accomplished by first choosing a portion of the code or data to be protected. The memory pages of system memory 16 that contains the code or data to be protected are then permuted. The permutation order used to reorder the memory pages is stored in embedded DRAM 15. Additionally, the permutation order may be further secured using encryption. When the permuted portion of code or data is accessed, a reverse, or reciprocal, of the permutation order is applied to the permuted portion of code or data in embedded memory 15. The reverse permutation order may also stored in embedded DRAM 15, or instead of the permutation order. In one embodiment, the data processing system may include multiple levels of address translation as discussed below. In one embodiment, where the permutation is performed prior to storing in system memory, only the reverse permutation order is stored for un-permuting the permuted memory pages.

Linux is an operating system that is commonly used in many data processing systems. In a multi-level addressing system using Linux, a mapping from virtual addresses to physical addresses is done via first-level address translation (FLAT) tables and in a hypervisor (when present) via second-level address translation (SLAT) tables. The permutation order may be implemented using a modification to a memory allocator (for FLAT tables) or a hypervisor (for SLAT tables). In accordance with an embodiment, the FLAT tables or SLAT tables may incorporate a permutation order ($\pi$) for the memory pages. That is, if a memory page is accessed, the FLAT/SLAT table can reverse the permutation order to arrive at the physical address of the memory page. The FLAT or SLAT tables that contain the permutation order $\pi$ are stored in OCRAM 15.

Figure 2:
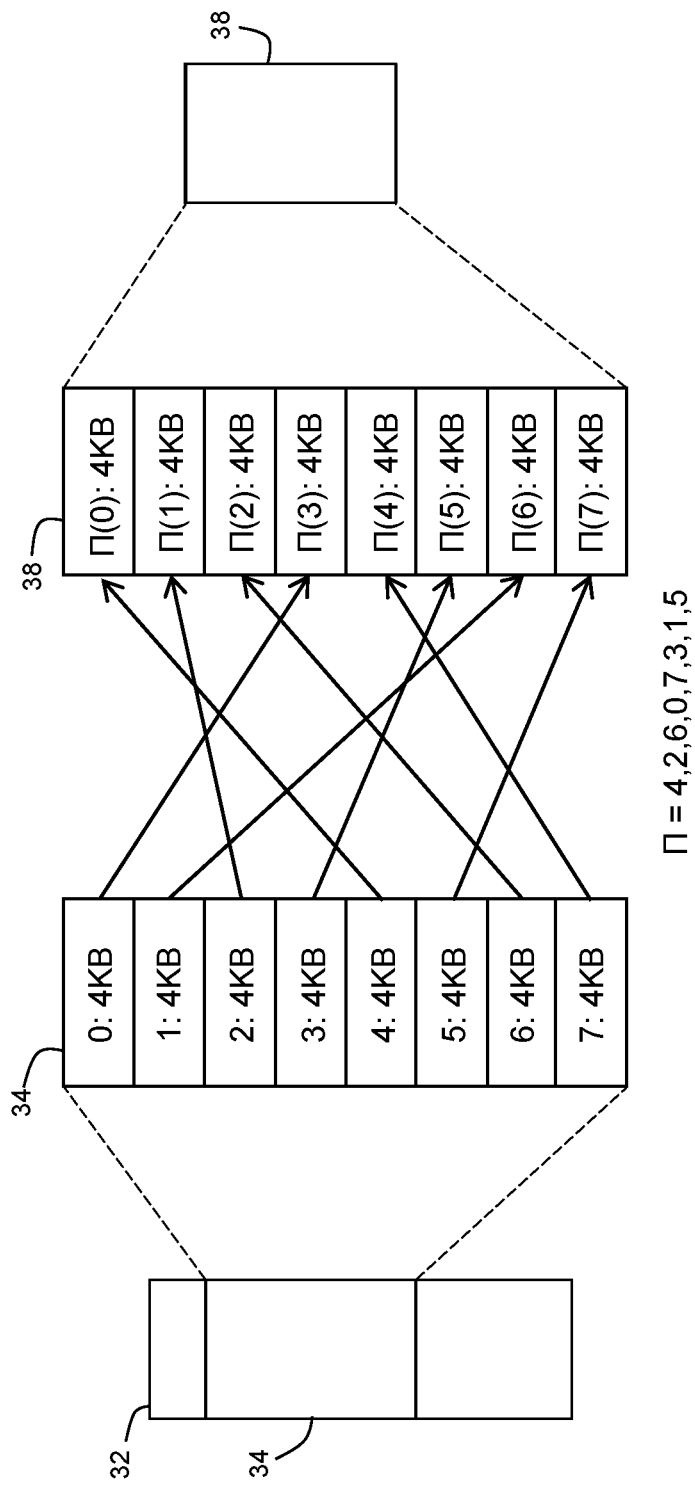
FIG. 2 illustrates an example memory permutation according to an embodiment.

FIG. 2 illustrates an example memory permutation according to an embodiment. In FIG. 2, data block 32 of system memory 16 (FIG. 1) may include a security sensitive application and/or data such as a machine learning (ML) model. In one example, data block 32 includes a collection of weights for the ML model. A portion 34 of the data block 32 is selected. The portion 34 may be made up of a plurality of contiguous memory pages or discontiguous memory pages. In one embodiment, the portion may include the entire stored data or code. A size of portion 34 may be determined by a size of embedded memory 15. Typically, an embedded memory is much smaller than a system memory. As can be seen in FIG. 2, portion 34 includes eight 4 KB pages ordered from 0 to 7. As an example, a permutation order $\pi$=4,2,6,0,7,3,1,5 is applied to the portion 34 resulting in a permuted portion 38 labeled from $\pi(0)$ to $\pi(7)$. Permutation order $\pi$ is stored in embedded memory 15. The permutation can be applied at any level of address translation. The permutation order cannot be easily copied from embedded memory 15 using a freeze attack because an embedded memory is only accessible by the processor in which it is embedded.

Figure 3:
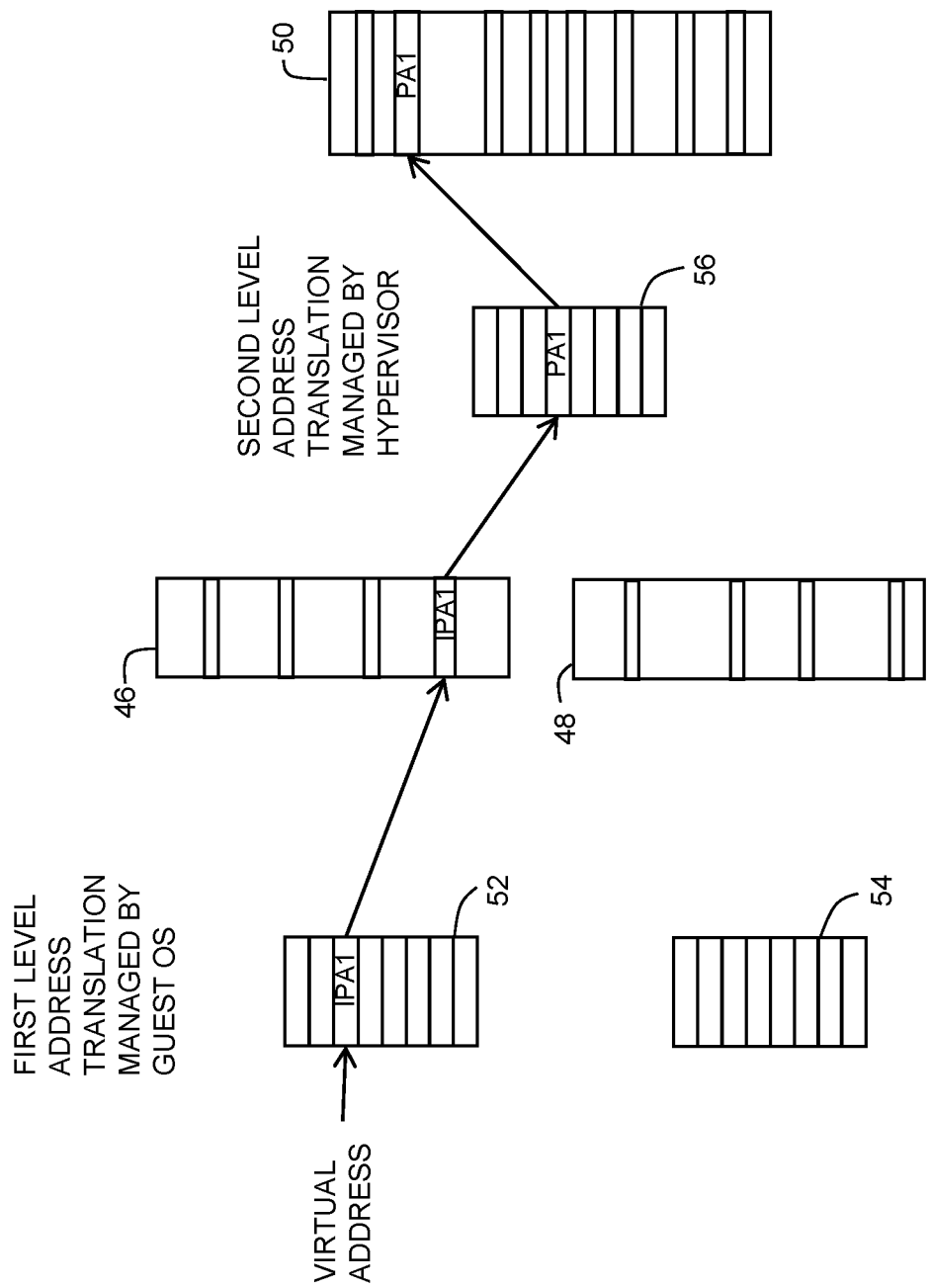
FIG. 3 illustrates two levels of address translation in a data processing system.

FIG. 3 illustrates two levels of address translation in a data processing system such as data processing system 10. In a virtualization system, multiple guest operating systems can operate in parallel in the same data processing system. A hypervisor is used to manage the resources between the multiple guest operating systems. The data processing system can be implemented such that a guest OS does not even know it is connected to a virtual machine under control of a hypervisor. A virtual memory system may be used to allocate the physical memory resources. Two or more levels of address translation may be used in the virtual memory system. A first level address translation (FLAT) is controlled by the guest OS and maps a virtual address (VA) to an intermediate physical address (IPA). A second level address translation (SLAT) is controlled by the hypervisor and maps the IPA to a physical address (PA).

Address translation generally happens on a memory page basis where a memory page is typically 4 KB in size and pages are 4 KB aligned in memory (as shown in FIG. 2). Each VA consists of a page number and a page offset. The page number is translated via address translation and the page offset is added to the translated page number to obtain a translated memory address. One or more guest operating systems perform the FLAT to generate an IPA from a VA. The IPA is stored in memory portions 46 and 48 of system memory 16. Then, hypervisor 56, which may be implemented in processor 14 or co-processor 22, performs the SLAT to generate a PA from the IPA to select a memory page in system memory 16. As an example, a virtual address VA 1 in guest OS 52 is translated to IPA 1 and stored in a memory location in memory portion 46. The SLAT, which is managed by hypervisor 56, receives IPA 1 and translates IPA 1 to a physical address PA 1. Physical address PA 1 is then used to address a memory page in memory 50, or to select another resource in the data processing system. FLAT and SLAT tables may be used in the address translation. In addition, the FLAT and SLAT tables may also access the permutation order $\pi$ in accordance with an embodiment. The permutation of the memory pages may be performed at the FLAT or the SLAT levels.

Besides address translation, the FLAT and SLAT may also perform read and write operations and execute permission checks. For example, a load instruction needs the read permission to read the memory page. Similarly, store instructions need write access and every instruction needs execute access. When FLAT and SLAT access rights are violated, the operating system and/or hypervisor is notified via an exception. In one embodiment, the access rights associated with the memory pages are stored in FLAT and SLAT access rights tables (not shown).

Figure 4:
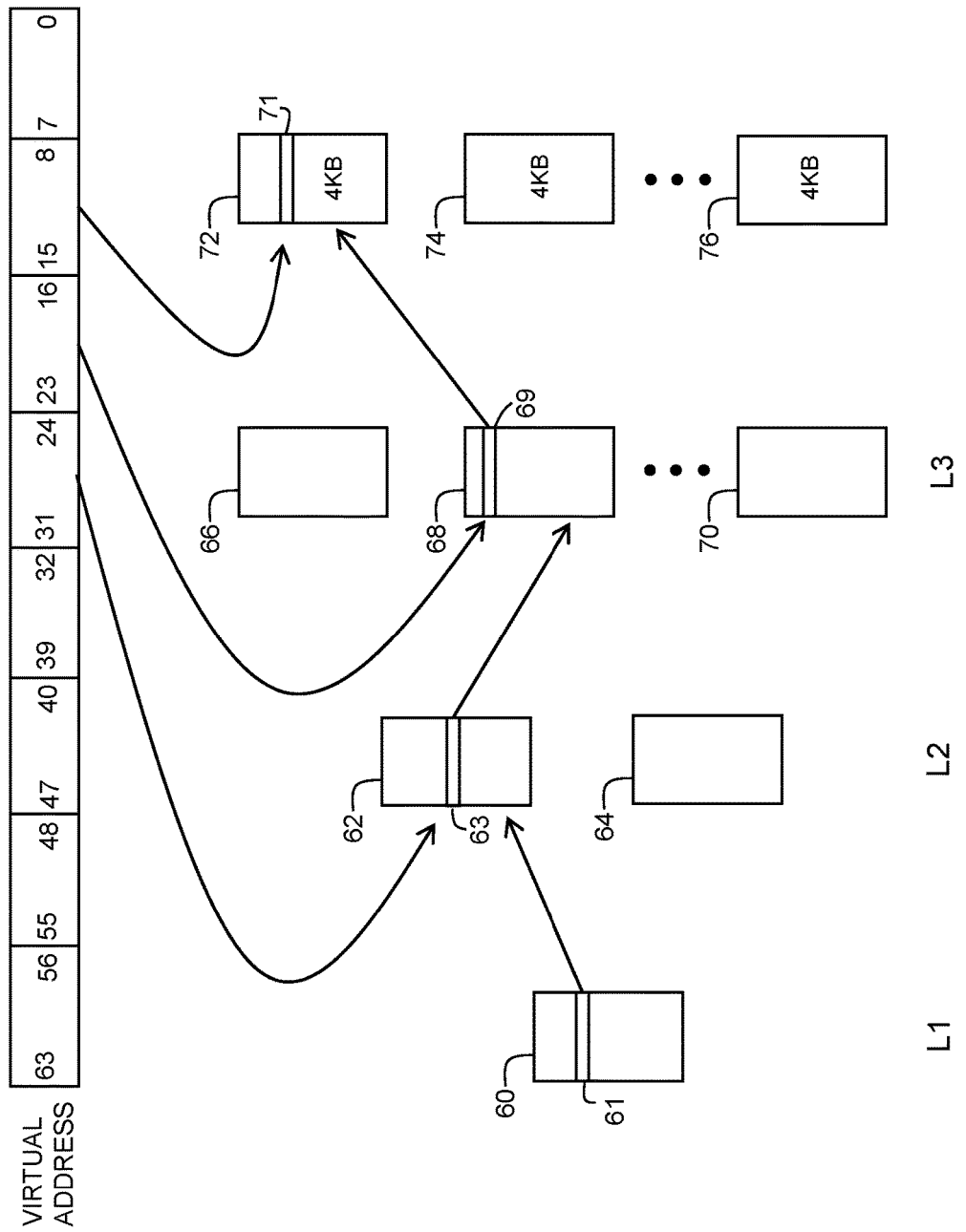
FIG. 4 illustrates three levels of page tables for addressing a memory page.

As an example, in Linux, the addressing is done via page tables and memory pages as illustrated in the example embodiment of FIG. 4. A plurality of memory pages illustrated in FIG. 4 has memory pages 72, 74, and 76. As mentioned above, the memory pages are 4 KB blocks of contiguous physical memory which may be implemented as DRAM. The page tables are also 4 KB in size and are used to translate virtual addresses to physical addresses for accessing a physical location in a memory page. The page tables are used in a hierarchical structure. A three-level hierarchy is illustrated in FIG. 4 and labeled L1, L2, and L3. Level-1 includes page table 60, L2 includes page tables 62 and 64, and L3 includes page tables 66, 68, and 70. The highest-level page table (L3) points to the physical address of the memory pages that needs to be accessed and the other page tables indicate the location in physical memory where the next higher-level page table is stored. There can be any number of levels of page tables. As an example, a 4 KB level-3 (L3) page table may have 512 entries of 64-bits, each. Each entry pointing to a 4 KB memory page. It can thus address 512 4 KB=2 MB of data. For example, an entry 61 in page table 60 points to an entry 63 in page table 62, which points to an entry 69 in page table 68. Page table 68 in L3 points to data 71 in memory page 72. An example virtual address in FIG. 4 includes 64 bits delineated in 8-bit long bytes. The virtual address may include one or more offsets that may be applied to each page table entry as shown in FIG. 4. Hence, if a memory allocator allocates memory for a machine learning model via contiguous physical memory blocks of 2 MB, the entire 10 MB ML model of the current embodiment can be addressed via 10/2=5 L3 tables that are fully dedicated to addressing the ML model. Note that in one embodiment, only the order of the page tables is permuted. The order of the entries within each page table is not changed in the disclosed embodiment.

When a permutation order is applied to a portion of code or data, the memory allocator of Linus needs to be adjusted to compensate for the permutation so that it generates an L3 table that directs an access to the correct memory page whether the correct page is in system memory 16 or embedded memory 15 (FIG. 1). To decide whether the code or data should be treated as permuted or not, one possible strategy is for the memory allocator to use hashes of the data. In one embodiment, the memory pages that include security sensitive data or code can be hashed when the code and/or data is created, where one hash value is computed for each memory page. These hash values are then provided in a table to a hypervisor or operating system (OS). The hypervisor or OS can then reorganize the memory pages by computing the hash when the memory pages are encountered by the hypervisor or OS for the first time. If the hash of an encountered memory page is in the accessed hash table, the hypervisor or OS knows that the encountered memory page includes sensitive information. This may then be used to influence memory allocation and the allocation of the memory page tables that refer to the sensitive memory pages. For additional security, the permutation order, such as permutation order $\pi$, used by the memory allocator should be stored securely. For instance, the permutation order can be stored encrypted, where a key needed for decryption of the permutation order is stored in secure hardware such as secure element 18 in FIG. 1. Preferably, in one embodiment, the permutation order may be stored in embedded memory 15 to protect against a freeze attack. Also, the tables that store the inverse of the permutation order are stored in embedded memory 15 to protect them from a freeze attack.

A successful freeze attack can potentially provide access to the entire contents of system memory 16. In order for the attacker to extract a machine learning model from memory 16, the attacker needs to locate the relevant memory pages and put them in the correct order. Identifying the collection of memory pages may be feasible to an attacker because they may stand out due to their format (e.g., a collection of floating-point numbers). However, without knowing the permutation order, the number of possibilities in the above described example is 2,560! because the 10 MB ML model consists of 2,560 memory pages. Doing an exhaustive search may be infeasible for the attacker.

Note that even though the method for protecting code or data is described in the context of Linux using a memory organized in memory pages, in another embodiment, the operating system and/or memory organization may be organized differently.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for protecting data or code stored in a first addressing order in a first memory from a freeze attack, the method comprising:
choosing a plurality of memory pages of the data or code to permute, wherein the plurality of memory pages is less than all pages of the data or code stored in the first memory, wherein the data or code of the plurality of memory pages is hashed when the data or code is created and the data or code is relatively more security sensitive than data or code that is not security sensitive, wherein a hash value is computed for each memory page of the plurality of memory pages that includes the security sensitive data or code, and wherein the hash values are stored in a table that is accessed to determine if an accessed memory page includes the security sensitive data or code;
randomly generating a permutation order;
using the permutation order, permuting the first addressing order of the plurality of memory pages of the data or code to be a second addressing order different from the first addressing order; and
storing the permutation order in a second memory, wherein the second memory has a smaller storage capacity than the first memory.

2. The method of claim 1, wherein the first memory is a standalone dynamic random-access memory (DRAM) and the second memory is embedded in a processor.

3. The method of claim 2, wherein the second memory is an embedded DRAM.

4. The method of claim 1, wherein the permutation order is stored in a memory address table for mapping virtual addresses to physical addresses.

5. The method of claim 4, wherein the memory address table is one of either a first level address translation table (FLAT) or second level address translation table (SLAT) in a data processing system having a hypervisor for managing the second level address translation.

6. The method of claim 1, wherein a size of each memory page of the plurality of memory pages is 4 kilo bytes (KB).

7. The method of claim 1, wherein the permutation order is stored encrypted in the second memory.

8. The method of claim 1, wherein the plurality of memory pages of data or code is a contiguous portion of data or code.

9. A method for protecting data or code stored in a first memory of a data processing system from a freeze attack, the data processing system having a first level of address translation (FLAT) and a second level of address translation (SLAT), the method comprising:
choosing a plurality of memory pages of data or code stored in the first memory, wherein the plurality of memory pages of data or code is less than all pages of the data or code stored in the first memory, wherein the data or code of the plurality of memory pages is hashed when the data or code is created and the data or code is relatively more security sensitive than data or code that is not security sensitive, wherein a hash value is computed for each memory page of the plurality of memory pages that includes the security sensitive data or code, and wherein the hash values are stored in a table that is accessed to determine if an accessed memory page includes the security sensitive data or code;
randomly generating a permutation order;
using the permutation order, permuting the addressing order of the plurality of memory pages of the data or code in one of the FLAT or the SLAT; and
storing the permutation order in a second memory, wherein the second memory has a smaller storage capacity than the first memory.

10. The method of claim 9, wherein the second memory is embedded in a processor of the data processing system.

11. The method of claim 9, wherein the permutation order is stored in a FLAT table or a SLAT table.

12. The method of claim 9, wherein the permutation order is stored encrypted in the second memory.

13. A data processing system comprising:
a bus;
a processor having an embedded memory coupled to the bus; and
a system memory coupled to the bus, wherein the system memory is organized in pages, wherein pages of the system memory that store a portion of data or code is permuted using a randomly generated permutation order, wherein the portion of data or code is less than all of the data or code stored in the system memory, and wherein the portion of data or code is stored in the system memory in the permutation order, and wherein the permutation order is stored in the embedded memory, wherein the data or code of the pages of the system memory is hashed when the data or code is created and the data or code is relatively more security sensitive than data or code that is not security sensitive, wherein a hash value is computed for each page of the pages of the system memory that includes the security sensitive data or code, and wherein the hash values are stored in a table that is accessed to determine if an accessed memory page includes security sensitive data or code.

14. The data processing system of claim 13, wherein the permutation order is stored encrypted in the embedded memory.

15. The data processing system of claim 13, wherein the data processing system is implemented with a first level of address translation (FLAT) controlled by an operating system and a second level of address translation (SLAT) controlled by a hypervisor, and wherein the permutation order is implemented in one of the FLAT or the SLAT.

16. The data processing system of claim 13, wherein the system memory is a dynamic random-access memory (DRAM) that is vulnerable to a freeze attack.

* * * * *